United States Patent [19]

Iwata et al.

[11] Patent Number: 5,482,133
[45] Date of Patent: Jan. 9, 1996

[54] TRACTION CONTROL FOR AUTOMOTIVE VEHICLE

[75] Inventors: Toru Iwata; Terukiyo Murakami; Minoru Tamura, all of Yokohama; Tomohiro Fukumura, Yokosuka, all of Japan

[73] Assignee: Nissan Motor Co., Ltd., Yokohama, Japan

[21] Appl. No.: 173,952

[22] Filed: Dec. 28, 1993

Related U.S. Application Data

[63] Continuation of Ser. No. 725,802, Jul. 9, 1991, abandoned.

[30] Foreign Application Priority Data

Jul. 9, 1990 [JP] Japan ................................ 2-179427

[51] Int. Cl.$^6$ .............................. B60K 28/16; B60T 8/32
[52] U.S. Cl. ........................ 180/197; 180/79.1; 180/140; 303/140; 364/424.1
[58] Field of Search ................................ 180/197, 140, 180/141, 142, 233, 79.1; 280/91, 707, 702, 711; 364/424.1, 426.02, 426.03, 426.05; 303/93, 100, 95

[56] References Cited

U.S. PATENT DOCUMENTS

| | | |
|---|---|---|
| 4,696,489 | 9/1987 | Fujishiro et al. . |
| 5,004,064 | 4/1991 | Tezuka et al. ......................... 180/197 |
| 5,009,279 | 4/1991 | Matsuda ................................ 180/197 |
| 5,014,809 | 5/1991 | Matsuda ................................ 180/197 |
| 5,048,633 | 9/1991 | Takehara et al. ...................... 180/197 |
| 5,069,302 | 12/1991 | Kageyama ............................. 280/707 |
| 5,089,967 | 2/1992 | Haseda et al. ........................ 180/197 |
| 5,090,510 | 2/1992 | Watanabe et al. ..................... 180/197 |
| 5,141,071 | 8/1992 | Edahiro et al. ....................... 180/197 |

FOREIGN PATENT DOCUMENTS

| | | | |
|---|---|---|---|
| 311131 | 4/1989 | European Pat. Off. ............... | 180/197 |
| 378202 | 7/1990 | European Pat. Off. ............... | 180/197 |
| 3637820 | 5/1987 | Germany ............................... | 180/197 |
| 3832768 | 4/1989 | Germany ............................... | 180/197 |
| 67606 | 4/1986 | Japan ................................... | 180/197 |
| 64-44368 | 2/1989 | Japan . | |
| 109181 | 4/1989 | Japan ................................... | 180/197 |
| 226446 | 9/1989 | Japan ................................... | 180/197 |
| 2192160 | 1/1988 | United Kingdom ................... | 180/197 |

OTHER PUBLICATIONS

Vehicle Dynamics Terminology, SAE J670e, Society of Automotive Engineers, Inc., Jun., 1978.
Nissan Skyline RS 32 Type Vehicle Service Manual No. 622, pp. C-97 to C-104 (published in May 1989).

Primary Examiner—Mitchell J. Hill
Attorney, Agent, or Firm—Lowe, Price, Leblanc & Becker

[57] ABSTRACT

In order to prevent a traction control system and an auxiliary steering or the like from combining stabilizing effects in a manner which causes excessive understeer, when the traction control is functioning in a predetermined manner, a signal is issued to the auxiliary steering control and reduces the gain with which the control thereof is implemented. As a result excessive understeer is avoided while maintaining suitable vehicle stability.

22 Claims, 7 Drawing Sheets

TRACTION CONTROL FOR AUTOMOTIVE VEHICLE

This application is a continuation of application Ser. No. 07/725,802 filed Jul. 9, 1991 now abandoned.

BACKGROUND OF THE INVENTION

1. Field of the Invention

The present invention relates generally to a traction control for an automotive vehicle and more specifically to such a type of system which can used in combination with an auxiliary steering control or the like type of device.

2. Description of the Prior Art

JP-A-64-44368 discloses a previously proposed traction control arrangement which, when wheel slip occurs, has reduced the torque which is supplied to the left and right driven road wheels in order to attenuate the problem, In this prior art arrangement a suitable control pattern or schedule (brake pressure varying rate) is selected on the basis of the skid condition indicative data.

This arrangement is such that, in order to stabilize cornering, the braking control is such as to increase the understeer tendency. However, when this control is used in combination with a steering control such as the type which includes auxiliary rear wheel steering, the effects of the braking system and the auxiliary steering system combine in a manner which causes the understeer tendency to become excessively strong. This of course induces the drawback that the vehicle tends to response to this control in a manner wherein the turning characteristics deviate from those which are expected by the driver to one wherein the required amount of yaw is more difficult to achieve.

SUMMARY OF THE INVENTION

It is an object of the present invention to provide a vehicle control system which, upon the amount of braking being varied to control wheel slip, the control amount by which the operation of a variable steering control system is changed, is reduced to prevent sudden increases in understeer and the like type of changes in the vehicle steering characteristics.

In brief, the above object is achieved by an arrangement wherein, in order to prevent a traction control system and an auxiliary steering or the like from combining stabilizing effects in a manner which causes excessive understeer, when the traction control is functioning in a predetermined manner, a signal is issued to the auxiliary steering control and reduces the gain with which the control thereof is implemented. As a result excessive understeer is avoided while maintaining suitable vehicle stability.

More specifically, a first aspect of the present invention comes in an arrangement which features: means for detecting a driven wheel of the vehicle undergoing wheel slip; traction control means for reducing the amount of drive force which can be transmitted by the driven wheel; means for varying the vehicle steering characteristics; and means for reducing the amount of understeer which can be induced by the vehicle steering characteristic varying means when the traction control is active and is reducing the amount of drive force which is being transmitted by the driven wheel.

A second aspect of the invention comes in an arrangement which features: wheel slip detection means for detecting the wheel speed and braking force of a driven wheel which is undergoing wheel slip; traction control means for modifying the amount of driving force which is applied to the driven wheel in response to the wheel slip detection means detecting wheel slip; means for varying the steering characteristics of the vehicle; means for detecting the vehicle traversing a curved path; means responsive to traction control means being operative to modify the amount of driving force which is supplied to the driven wheel for causing the steering characteristic varying means to reduce the amount of understeer which is induced by the operation thereof.

DETAILED DESCRIPTION OF THE PREFERRED EMBODIMENTS

Figure 1:
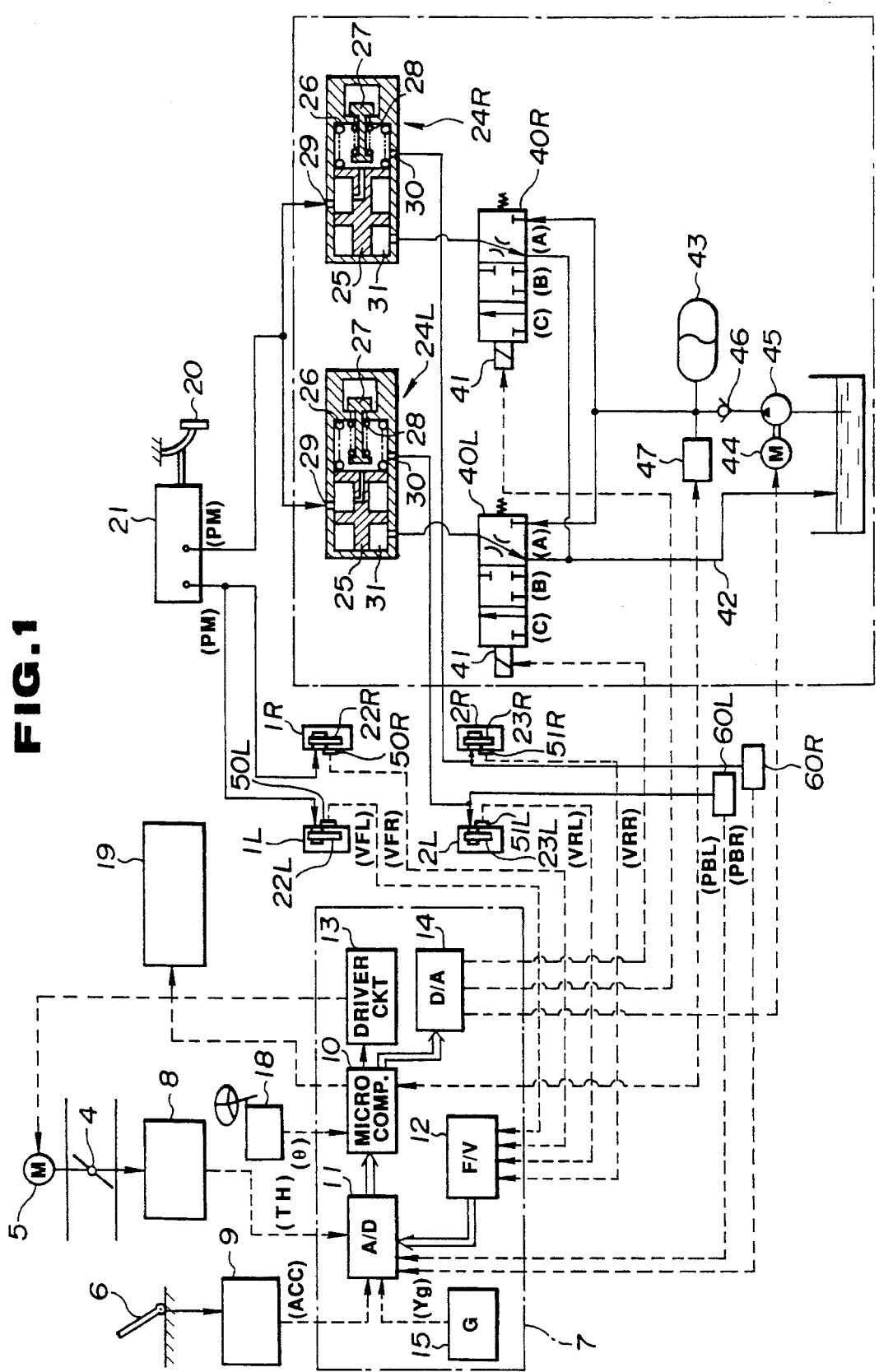
FIG. 1 is a schematic layout showing a traction control system to which a first embodiment of the present invention is applied.

FIG. 1 shows a traction control system according to a first embodiment of the present invention. In this FIG. 1L, 1R denote vehicle wheels (e.g. the front wheels of the vehicle); 2L, 2R denote driven road wheels which is are operatively connected with an engine of the vehicle by way of a suitable clutch and transmission arrangement; and 4 denotes a throttle valve which controls the amount of air which is supplied to the engine and therefore determines the amount of torque produced by the same. In this arrangement the throttle valve 4 is operatively connected with a servo motor 5 which is arranged to incrementally change the opening of the valve in accordance with the amount of engine output which is indicated by the position of an accelerator pedal 6.

As shown, the control circuit 7 is arranged to receive a signal TH from a throttle position sensor 8 which operatively connected with the throttle valve 4 in a manner which enables feedback control of the servo motor 5. The accelerator pedal is operatively connected with an accelerator pedal depression sensor 9 which outputs a Act signal to the control circuit 7.

The control circuit 7 includes a microprocessor 10, a A/D converter, 12, a motor driver circuit 13 and a D/A converter 14, which are operatively connected in the manner schematically illustrated. In this embodiment an I/C type G sensor 15 which in this instance is arranged to detect lateral acceleration and output a signal Yg, is included in the control circuit 7 and circuited in the illustrated manner.

A steering angle sensor 18 is operatively coupled to the steering wheel and arranged to output a digital signal (Ø) to the microcomputer 10.

A variable steering characteristic controller 19 is operatively connected with the microcomputer and arranged to receive a data input therefrom. Further disclosure relating to this device will be given later.

A brake pedal 20 is operatively connected with a master cylinder 21 and arranged to output a hydraulic pressure Pm which varies with the degree of depression of the pedal 20. This pressure is supplied to wheel cylinders 22L, 22R, 23L & 23R which are respectively associated with the road wheels 1L, 1R, 2L & 2R and which determine the amount of braking force which is applied to the same.

The brake circuit which establishes fluid communication between the master cylinder 21 and the driven road wheels 2L, 2R include pressure control valves 24L, 24R which are operated by the traction control system. These valves includes spools 25 which are biased by springs 26 to assume the illustrated positions, and plungers 27 which are biased to the illustrated position by springs 28. The spools each have a transfer passage structure formed therein which by-pass one of the lands formed thereon.

The two pressure control valves 24L, 24R are such as to normally transmit master cylinder pressure Pm from input ports 29 to output ports 30. When the spools 25 move sufficiently against the bias of the springs 26, the connection is cut-off. Upon communication between the two ports being cut-off, further pressure development in the wheel cylinders 23L, 23R is stopped.

Control chambers 31 are defined at the left hand end of the valves 24L, 24R and are communicated with electromagnetic valves 40L, 4OR. When the solenoids of these valve are OFF, these valves assume a condition (A) wherein the chambers 31 are connected with a drain conduit 42 and communication between the chambers 31 and an accumulator 43 is cut-off. When the valves 40L, 40R are energized (ON) at a first predetermined low level, they assume a condition (B) wherein communication between the chambers 31 and both of the drain conduit 42 and the accumulator 43 are cut-off. When the energization current is increased to a second higher level, the valves assume conditions (C) wherein communication between the drain conduit 42 is cut-off and communication with the accumulator 43 established.

When the electromagnetic valves 40L, 40R assume the (A) condition wherein no pressure is supplied into the control chambers 31, the spools 25 of the pressure control valves 24L and 24R are located in the illustrated positions. When the electromagnetic valves 40L, 40R are energized with the first level of current they supply a pressure into the control chambers 31 of the pressure control valves 24L, 24R which is sufficient to move the spools 25 to positions wherein they abut the plungers 27 and close off the transfer passages. This of course cuts off the communication between the input and output ports 29, 30. Upon the higher second level current being supplied to the solenoids of the electromagnetic valves 40L, 4OR, sufficient pressure is supplied into the pressure control valve control chambers 31 to move the spools 25 against both of the springs 26 and 28, displace the plungers 27 and establish a condition wherein the pressure prevailing in the wheel cylinders 23L and 23R can reduce.

By varying the duty cycle of the signals which are applied to the electromagnetic valves 40L, 40R the rate at which pressure is allowed to be relieved (for example) from the wheel cylinders 23L, 23R can be controlled. For example if the current can be increased and decreased between the first and second levels, in order to achieve the above type of control.

Figure 4:
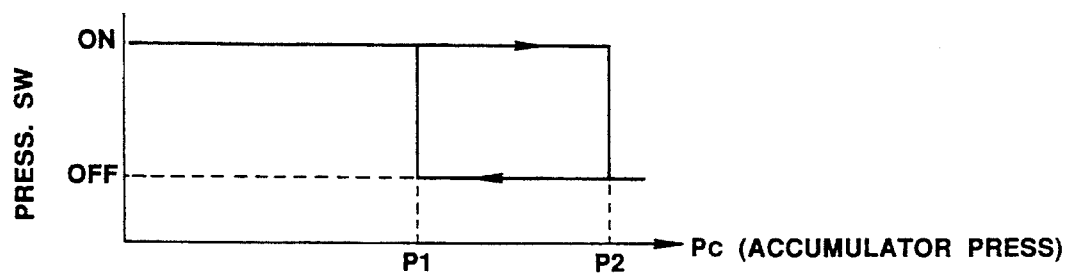
FIG. 4 is a diagram showing pump control hysteresis.

The accumulator 43 is fluidly communicated with a pump 45 which is driven by pump motor 44. A check valve 46 interposed between the pump and the accumulator to prevent reverse flow while a pressure sensor 47 is arranged to sense the pressure prevailing in the accumulator 43. The output of the pressure sensor 47 is supplied to the microcomputer 10 which in turn controls the operation of the pump 44 by way of the D/A converter 14. In this case the pressure sensor is arranged to output an ON/OFF type signal which as shown in FIG. 4 exhibits hysteresis characteristics wherein it assumes an ON from the time the accumulator pressure Pm drops below pressure P1, until the time a pressure reaches a second pressure P2 which is higher than P1.

The solenoids of the electromagnetic valves 40L, 40R are also circuited with the microprocessor by way of the D/A converter 14 which converts digital control signals into suitable analog ones.

Wheel speed sensors 50L, 50R, 51L, & 51R which are respectively disposed with the road wheels 1L, 1R, 2L & 2R are arranged to output pulse train signals VFL, VFR, VRL & VRR. These signals are supplied to the F/V converter 12 wherein they are converted into analog form and then relayed to the A/D converter 11 for submission to the microcomputer 10.

Pressure sensors 60L and 60R which sense the pressure prevailing in the wheel cylinders 23L and 23R are arranged to output signals PBL and PBR to microcomputer via the A/D converter 11.

Figure 2:
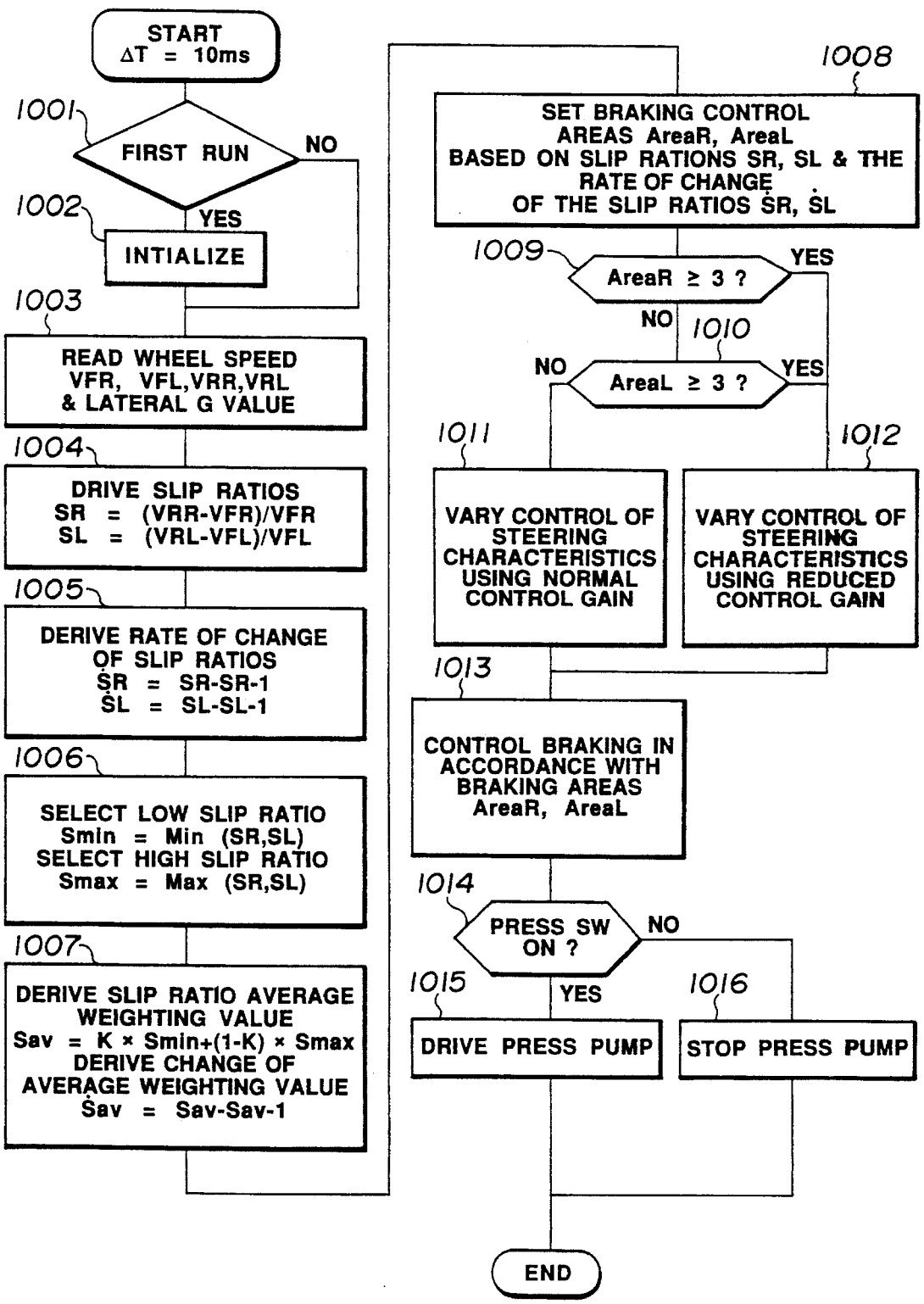
FIG. 2 is a flow chart which shows the steps which are executed by a microprocessor control routine in accordance with the first embodiment.

The microcomputer 10 contains a control routine of the nature shown in FIG. 2 which is arranged to directly control the operation of the electromagnetic valves 40L, 40R, the pump 47, the throttle valve servo motor 5 and to output a signal to the variable steering characteristic controller 19. This latter mentioned signal is such as to reduce the normal control gain with which the steering control is executed. The routine is arranged to be run at predetermined intervals ($\Delta T=10$ ms) via interrupt.

As will be appreciated, the first step 1001 of the routine is such as to determine if this is first run since the system was energized. In the event that the system has just been connected with a source of electrical power as the result of the ignition switch being closed, the routine proceeds to step 1002 wherein initialization is carried out. On the other hand, if this is not the first run, the routine by-passes and goes directly to step 1003 wherein the outputs VFL, VFR, VRL & VRR of the wheel speed sensors 50L, 50R, 51L, & 51R and the Yg signal from the G sensor 15, are read in.

At step 1004 slip ratios for the driven wheel 2L, 2R are derived using the following equations:

$$SL=(VRL-VFL)/VFL \qquad (1)$$

$$SR=(VRR-VFR)/VFR \qquad (2)$$

Following this at step 1005 the first time derivatives of the slip ratios are derived. Viz.:

$$\dot{S}L=SL-SL-1 \qquad (3)$$

$$\dot{S}R=SR-SR-1 \qquad (4)$$

wherein $\dot{S}L-1$ and $\dot{S}R-1$ denote the slip ratios which were recorded on the run immediately prior the instant one.

At step 1006 the lower slip ratio among the two ratios SL and SR is selected and set as Smin while the higher slip ratio is set as Smax. Following this at step 1007 the Smin and Smax values are used to derive an average weighting value Sav using the following equation:

$$Sav = K \times Smin + (1-K) \times Smax \quad (5)$$

wherein K is a ratio value of 0.6–0.9 (for example).

In the same step the rate at which the Sav value is changing is derived, Viz.:

$$\dot{S}av = Sav - Sav - 1 \quad (6)$$

(in this case also the $\dot{S}av-1$ value is the $\dot{S}av$ value which was derived on the previous run of the routine.

Figure 3:
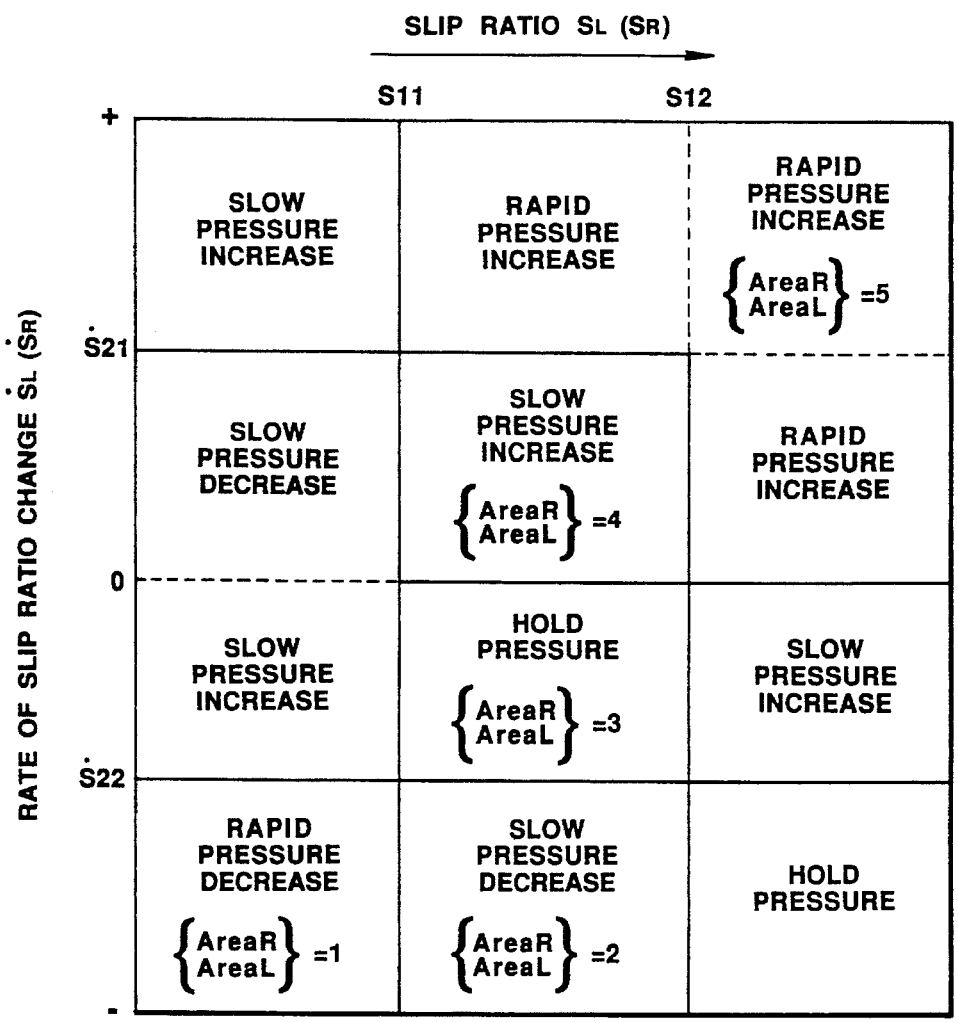
FIG. 3 is a map showing manner in which the zones into which the control according to the present invention, is divided, are arranged with respect to slip ratio and the first time derivative thereof.

The routine then goes to step 1008 wherein the slip ratios and the rates at which slip ratios are changing (viz., the first time derivatives of the slip ratios) are used to determine braking control areas—viz., AreaL and AreaR. These braking control areas are arranged as shown in FIG. 3. In this instance there are five areas 1–5 which are a rapid pressure increase zone (AreaR=5), a slow pressure increase zone (AreaR=4), a zone wherein the pressure is maintained (AreaR=3), a slow pressure decrease area (AreaR=2) and a rapid pressure decrease area (AreaR=1).

It should be noted that the slip ratios S11, S12 and slip ratio change rates S21 and S22 are derived using vehicle speed and G force inputs.

At step 1009 it is determined if the instant AreaR exhibits a value which is ≧3 or not (viz., determine if the brake control pressure should be increased or not). In the event of the a negative outcome the routine proceeds to step 1010 wherein it is determined if the value of AreaL is ≧3 or not. In the case that the outcomes of both of steps 1009 and 1010 are negative, then the routine flows to step 1011 wherein a command is issued to the variable steering characteristic controller 19 which induces control under normal gain. On the other hand, if either of the enquiries which are performed in steps 1009 and 1010 are positive (YES) the routine flows to step 1012 wherein a command to control the variable steering characteristic controller 19 in accordance with a reduced control gain.

In other words, if the routine flows to step 1011 as both of the left and right pressures are being controlled in the same manner, it can be assumed that overall traction control is not being performed and the steering can be controlled as per normal. On the other hand, if the routine goes to step 1012 then at least one of the right and left pressures is being maintained while the other is being changed. Accordingly, it can be assumed that traction control is currently being implemented and that the steering control gain should be reduced in order to prevent excessive understeer characteristics being induced.

In the instant embodiment the variable steering characteristic controller 19 can take the form of the rear wheel auxiliary steering device which is referred to as "Super HICAS" and which is disclosed in Nissan Skyline RS32 type vehicle Service Manual No. 622 pages C-97 to C-104 (published in May 1989) and English language publication entitled: NISSAN SUPER HICAS (EO-2000-8908).

Alternatively, this arrangement can take the form of a power steering arrangement disclosed on pages C-90 to C-95 of the above mentioned Service Manual No. 622.

it is also within the scope of the present invention that the variable steering characteristic controller 19 may comprises a suspension of the type disclosed in Nissan Cedric/Gloria Service Manual No. 578, per for example pages C-73–C92 (published June 1987) which teaches an air suspension system that can be selectively adjusted by a user to a "high", "sporty" or "normal" suspension height setting, and in which the spring constant and the damping force are changeable; a suspension of the type disclosed in U.S. Pat. No. 4,696,498 issued on Sep. 29, 1987 in the name of Fujishiro et al which teaches an automotive suspension system with variable damping characteristics; a four-wheel drive arrangement of the nature disclosed in the Nissan Bluebird U12 type vehicle Service Manual No. 588 on pages C-30–C46, which teaches a system in which torque is split between the front pair and rear pair of driven wheels in a user-selected ratio by a viscous-type limited slip differential; or a suspension of the nature disclosed on pages C50–C59 in short, it will be noted that in accordance the present invention is not limited to the use of a device which actually modifies the steering per se and can be extended to variable suspensions such as semi and fully active type suspensions, four wheel drive arrangements wherein the torque to the front and rear drive wheels can be selectively controlled, and other arrangements, the operation of which is capable of selective operation and wherein modification of the vehicle understeer characteristics is possible. These cited examples relate to existing and commercially available systems of various types with which the present invention can be used.

After flowing through either of steps 1011 and 1012, the routine goes to step 1013 wherein the braking control based on the braking areas AreaL and AreaR determined in step 1008, is implemented. This control involves using the outputs PBL, PBR of the pressure sensors 60L and 60R in combination with pre-recorded data to develop suitable duty cycle signals which are applied to the solenoids of the electromagnetic valves 40L, 40R.

Following this, at steps 1014 to 1016 control of the pump motor 45 is determined based on the output of the pressure sensor 47.

Figure 5:
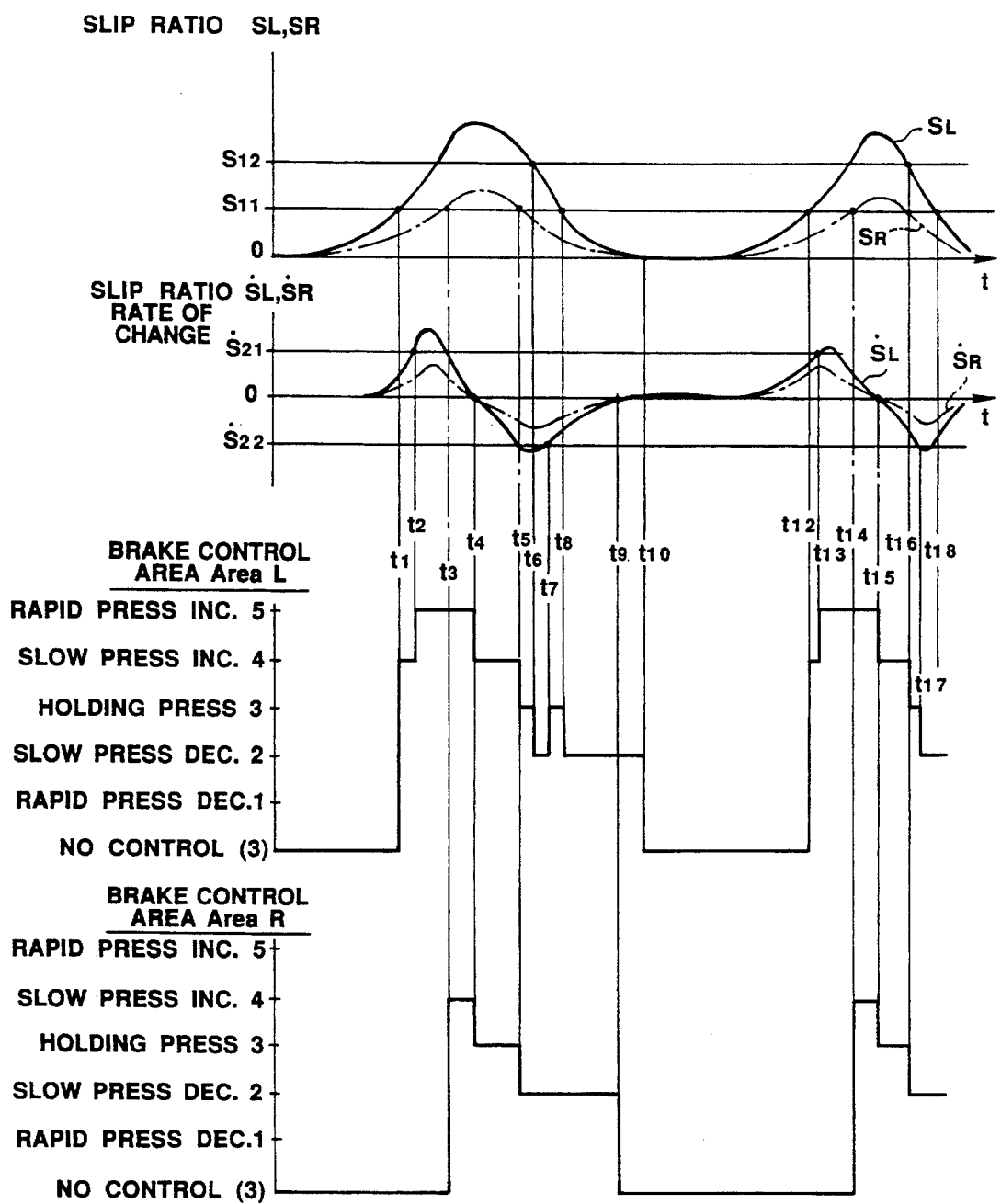
FIG. 5 is a timing chart which demonstrates the type of control which is possible with the instant invention.

An example of the operation of the first embodiment is given in timing chart form in FIG. 5. In this example it will be assumed that both driven wheels undergo wheel slip and that the amount slip that the left hand wheel undergoes is greater than that of the right hand wheel. In connection with the left brake pressure PBL, until time t1 no control is effected and the braking zone is (AreaL=3). However, at time t1 the solid line trace SL reaches the slip ratio limit S11. Following this, the slip ratio change rate $\dot{S}L$ is such that $0<\dot{S}L<\dot{S}21$. Until time t2 the control area is one which induces a slow pressure increase (AreaL=4). After time t2 $\dot{S}L>\dot{S}L21$. From time t2 to t4 the braking area which is selected is AreaL=5 which induces a rapid increase in pressure. During the time period t4–t5 the rate of pressure increase returns to a slow one; during period t5–t6 the pressure is maintained (AreaL=3) and during the period t6–t7 slow pressure decrease control is implemented. During period t7–t8 the pressure is again held (AreaL=3), while during the period t8–t9–t10 slow pressure decrease control is implemented. At time t10 pressure control is stopped.

During this period the pressure PBR which is supplied to the right hand wheel cylinder follows the phantom line trace. As in the former case, the braking area is determined using the slip ratio SR and the slip ratio rate of change $\dot{S}R$. In this instance, until time t3 no control is induced. However, from time t3–t4 slow pressure increase is induced, while following this period t4–t5 the pressure is held, and subsequently followed by a period t5–t9 during which slow pressure decrease is implemented. At time t9 pressure control is stopped.

However, following time t12 the slip ratio SL again reaches the S11 value an the left brake pressure PBL is again controlled so as to exhibit a slow increase. During the period t13–t14–t15 rapid pressure increase in induced, while during the subsequent period defined between times t15–t16 the pressure increase is slowed. During the period t16–t17 the pressure is held and followed by a period t17–t18 during which a slow pressure decrease is induced.

On the other hand, during the time period t14~t15 the pressure PER is slowly increased, during the period t15~t16 the pressure is held and following time t16 a slow pressure reduction is implemented.

Thus, as will be appreciated, in accordance with the present invention, in order to prevent wheel slip the rate at which the left and right brake pressures are controlled during the traction control mode in accordance with left and right control maps or areas AreaL and AreaR. These areas are such that, in some cases the pressure is held constant and prevented from undergoing a change (viz., in response to areas AreaL=3 & AreaR=3).

At the same time as traction control is being implemented in connection with areas 3 and above, the gain at which auxiliary steering is controlled is reduced in order to prevent excessive understeer being induced and thus improve the stability with which cornering is enabled. However, during operation which fails in areas 2 or below (e.g. during period t8~t12) the gain with which the control of the auxiliary steering is implemented is returned to its normal level.

It will be noted that while traction and auxiliary steering controls have been integrated in the first embodiment in the event that the vehicle is equipped with a limited slip differential and the a larger difference develops being the left and right hand control areas, in order to prevent vehicle stability from being deteriorated, it is within the scope of the present invention to reduce the effect of this device during periods when traction control is actually being used even during the periods when slip is not occurring.

SECOND EMBODIMENT

Figure 6:
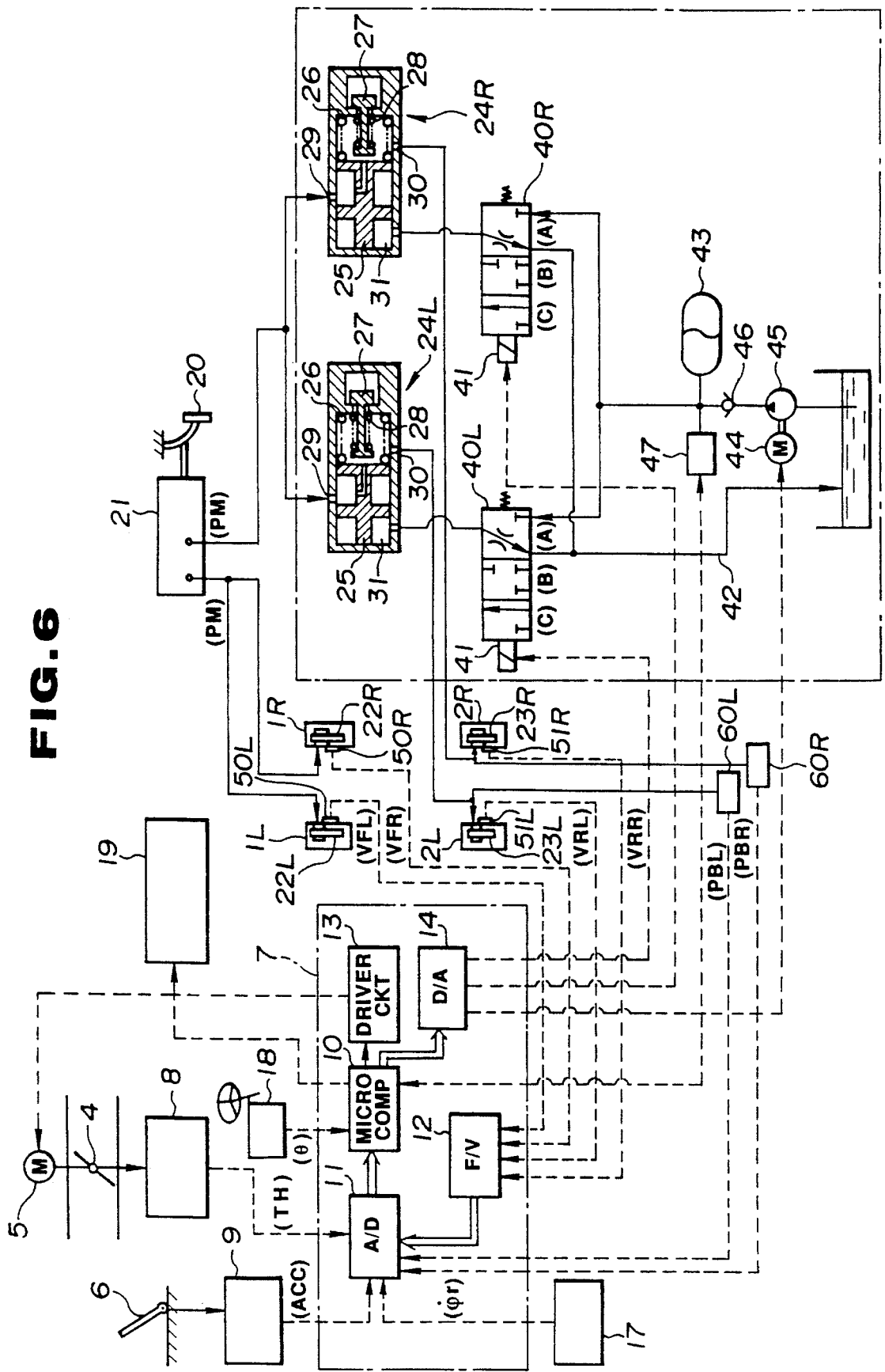
FIG. 6 is a schematic layout showing a traction control system to which a second embodiment of the present invention is applied.
Figure 7:
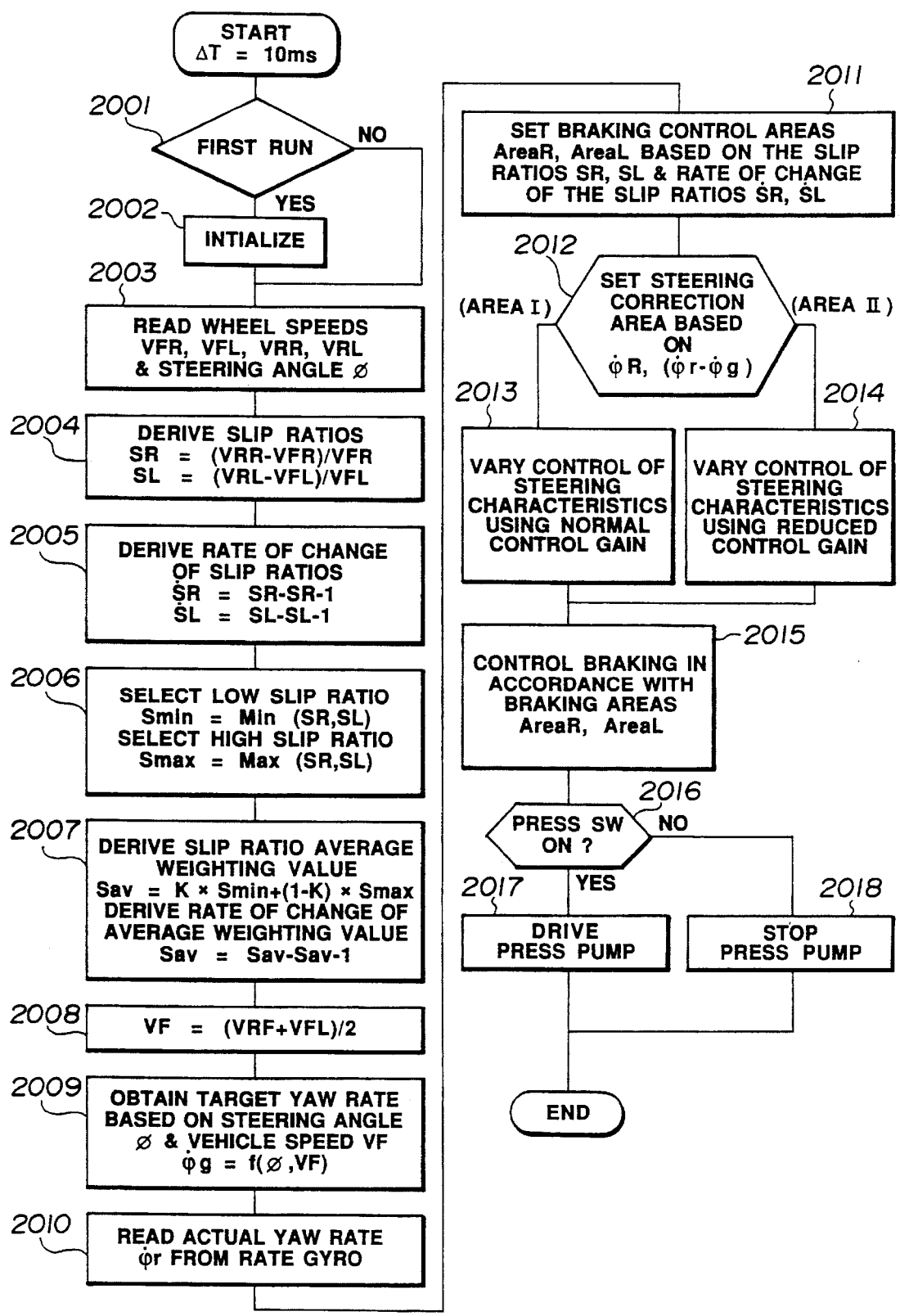
FIG. 7 is a flow chart which shows the steps which are executed by a microprocessor control routine in accordance with the second embodiment.

FIG. 6 shows a second embodiment of the present invention, This embodiment differs from the first in that a rate gyro 17 is used in place of the G sensor 15, and the output thereof $\psi r$ is supplied to the microcomputer 10 by way of the A/D converter 11. FIG. 7 shows the control routine which is used in this instance. In this instance also the routine is run at predetermined intervals (e.g. $\Delta T=10$ ms) via interrupt.

Steps 2001 to 2007 are essentially the same as steps 1001–1007 with the exception that at step 2003 the steering angle $\emptyset$ is read in place of the lateral G. At step 2008 the average of the left and right hand side wheel speeds is derived:

$$VF=(VRF+VFL)/2 \tag{7}$$

At step 2009 the $\emptyset$ and VF values are used to determine a target yaw rate $\psi g$ which is deemed optimal for the instant set of conditions. This $\psi g$ value can be read off from mapped data $\psi g=f(\emptyset, VF)$ and set in memory.

At step 2010 the input from the rate gyro $\psi r$ which is indicative of the actual yaw rate is read in.

Figure 8:
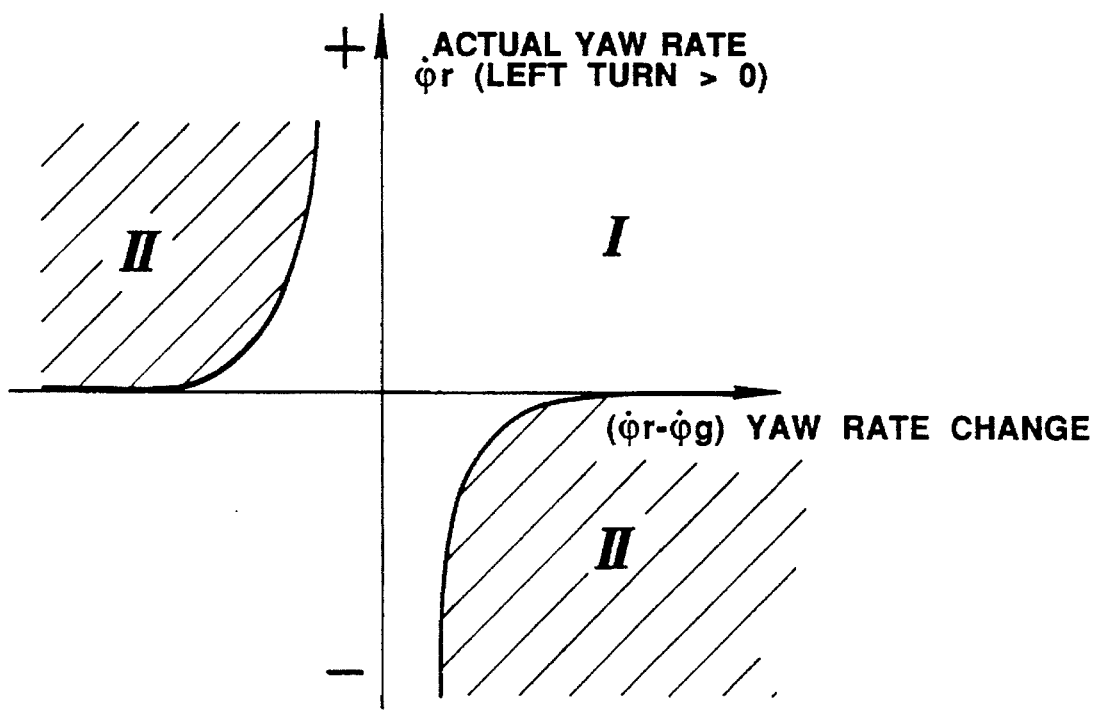
FIG. 8 is a graph showing actual yaw rate and yaw rate change.

Step 2011 is essentially the same as step 1008 of the first embodiment and utilize the slip rates and corresponding first time derivatives to determine the instant AreaL and AreaR. Following this, in step 2012 the actual and target yaw rates $\psi r$ and $\psi g$ are used to determine which first and second characteristic correction areas which should be used under the instant set of circumstances. This decision is made based on the mapping shown in FIG. 8 using the actual yaw rate $\psi r$ and the difference between the actual and target values ($\psi r-\psi g$).

It should be noted that in connection with this map, when the vehicle is turning left the value of $\psi r$ is positive (>0) and that when the absolute value of the same is large an oversteer tendency exists while in the event that it is small, an understeer tendency exists. Further, when the yaw rate $\psi$ exhibits a high absolute value a relatively large influence is exerted on the vehicle behavior.

Accordingly, area I is selected when the target yaw rate and the actual yaw rate are close or the actual yaw rate $\psi r$ is a little higher than necessary (viz., at level which will tend to induce oversteer), while area II is selected when the actual yaw rate $\psi r$ is not suitably matched with the target value $\psi g$.

Accordingly, if area I is nominated in step 2012 then the routine goes to step 2013 wherein a command is issued to very the steering characteristics using the normal gain, while in the event that area II is selected is indicated as being required then the routine goes to step 2014 where a command to control the steering using a gain which is lower than that normally used, is issued. This of course achieves the same effect as the first embodiment.

Steps 2016 to 2018 are essentially identical to steps 1014–1016 shown in FIG. 2 (first embodiment).

The second embodiment of the present invention is such that depending on the cornering characteristic of the vehicle, the variable steering characteristics are controlled in a manner which reduces the tendency for understeer to be produced by reducing the control gain. This embodiment provides the further advantage in that in the event that yaw has been rendered excessively easy, a counter steer effect is produced and corrects the vehicle yaw and behavior in a manner which brings the same into agreement with that which would be expected by the driver.

It should be noted that the second embodiment is such that if the vehicle is fitted with a limited slip differential, it is within the purview of the second embodiment to reduce the effect of the same during actual operation of the traction control system even when wheel slip is not occurring.

It is further possible to use the outputs of the wheel speed sensors and to derive the vehicle yaw rate in place of the rate gyro 17 if so desired. In addition, it is possible to use the difference between the actual and target yaw rates for feedback control purposes and use the same to derive the duty cycles of the signals which are used to modify the amount of torque which is permitted to be transmitted to each of the driven road wheels and thus enable the division of drive torque therebetween to be controlled.

It should be noted that the present invention is not limited to the exact hardware which is illustrated in FIGS. 1 and 6 and can employ a hydraulic control system of the nature disclosed on pages C-86~C89 of Nissan Skyline RS32 type vehicle Service Manual No. 622, i.e., a hydraulic arrangement which is capable of generating its own hydraulic pressure independently of the pressure produced by the master cylinder.

In this disclosure, there are shown and described only the preferred embodiments of the invention, but, as aforementioned, it is to be understood that the invention is capable of the use in various other combinations and environments and is capable of change or modifications within the scope of the invention concept as expressed herein.

What is claimed is:

1. An arrangement for use in an automotive vehicle, comprising:

means for detecting a driven wheel of the vehicle undergoing wheel slip;

traction control means for reducing a torque which is supplied to the driven wheel;

means having a variable control gain for varying a steering characteristic of the vehicle; and means for varying said control gain of said means for varying said vehicle steering characteristic when the traction control means is active and is reducing the torque which is being supplied to the driven wheel in order to prevent an excessive understeer of the vehicle from being induced.

2. An arrangement as claimed in claim 1, further comprising:

means for detecting a turning behavior of the vehicle, the control gain of the vehicle steering characteristic being varied according to the detected turning behavior of the vehicle.

3. An arrangement as claimed in claim 2, wherein said means for varying the vehicle steering characteristic comprises an auxiliary steering system which controls a steering angle of the rear wheels of the vehicle.

4. A vehicle as claimed in claim 2, wherein:

said means for varying the vehicle steering characteristic comprises a power steering system.

5. An arrangement as claimed in claim 2, wherein:

said means for varying the vehicle steering characteristic comprises a suspension having a spring constant which can be selectively varied.

6. An arrangement as claimed in claim 2, wherein:

said means for varying the vehicle steering characteristic comprises a suspension having a damping constant which can be selectively varied.

7. An arrangement as claimed in claim 2, wherein:

said means for varying the vehicle steering characteristic comprises variable suspension.

8. An arrangement as claimed in claim 2, wherein:

said means for varying the vehicle steering characteristic comprises a four-wheel drive wherein the respective amounts of torque supplied to the front and rear driving wheels can be varied.

9. An arrangement as claimed in claim 2, wherein:

said means for varying the vehicle steering characteristic comprises a variable limited slip differential which is operatively connected with the driving wheels of the vehicle.

10. An arrangement as claimed in claim 1, wherein:

said means for varying the vehicle steering characteristic comprises an auxiliary steering system which controls a steering angle of the rear wheels of the vehicle.

11. A vehicle as claimed in claim 1, wherein:

said means for varying the vehicle steering characteristic comprises a power steering system.

12. An arrangement as claimed in claim 1, wherein:

said means for varying the vehicle steering characteristic comprises a suspension wherein a spring constant can be selectively varied.

13. An arrangement as claimed in claim 1, wherein:

said means for varying the vehicle steering characteristic comprises a suspension wherein a damping constant can be selectively varied.

14. An arrangement as claimed in claim 1, wherein:

said means for varying the vehicle steering characteristic comprises a variable suspension.

15. An arrangement as claimed in claim 1, wherein:

said means for varying the vehicle steering characteristic comprises a four-wheel drive wherein the respective amounts of torque supplied to the front and rear driving wheels can be varied.

16. An arrangement as claimed in claim 1, wherein:

said means for varying the vehicle steering characteristic comprises a variable limited slip differential which is operatively connected with the driving wheels of the vehicle.

17. An arrangement for use in an automotive vehicle, comprising:

means for detecting a driven wheel of a vehicle undergoing wheel slip;

traction control means for reducing a torque which is supplied to the driven wheel;

means having a variable control gain for varying a steering characteristic of the vehicle;

means for varying said control gain of said means for varying said vehicle steering characteristic when the traction control is active and is reducing the torque which is being transmitted to the driven wheel, in order to prevent an excessive understeer of the vehicle from being induced; and means for detecting a turning behavior of the vehicle, the control gain of the vehicle steering characteristic being varied according to the detected turning behavior of the vehicle, said means for detecting turning behavior including a rate gyro which detects an actual yaw rate applied to the vehicle.

18. An arrangement for use in an automotive vehicle, comprising:

means for detecting a driven wheel of a vehicle undergoing wheel slip;

traction control means for reducing an amount of torque which can be transmitted to the driven wheel;

means having a variable control gain for varying a vehicle steering characteristic; and means for reducing said control gain of said means for varying said vehicle steering characteristic when the traction control means is active and is reducing the amount of torque which is being transmitted to the driven wheel.

19. An arrangement for use in an automotive vehicle, comprising:

means for detecting a driven wheel of a vehicle undergoing wheel slip;

traction control means for reducing an amount of torque transmitted to the driven wheel;

means having a variable control gain for varying a vehicle steering characteristic; and means for reducing said control gain of said means for varying said vehicle steering characteristic when the traction control means is active and is reducing the amount of torque which is being transmitted to the driven wheel, in order to prevent an excessive understeer of the vehicle from being induced.

20. A traction control system for an automotive vehicle, comprising:

slip detecting means for detecting a slip ratio of a driven wheel of the automotive vehicle and generating a corresponding signal;

means for calculating a time rate of change of the slip ratio of the driven wheel upon receiving said signal from said slip detecting means;

selecting means for selecting a braking control level from a map according to the detected slip ratio and the corresponding change rate of the slip ratio of the driven wheel;

braking means for controlling the driven wheel according to the selected braking control level; and varying means for varying a steering characteristic of the automotive vehicle, said steering characteristic varying means being set so as to prevent excessive understeer when the selected braking control level is higher than a predetermined level.

21. The traction control system as claimed in claim 20, wherein:

a braking control level is selected from a rapid increase level, a slow increase level, a maintaining level, a slow decrease level and a rapid decrease level in the map.

22. The traction control as claimed in claim 21, wherein:

said varying means is set so as to prevent said excessive understeer when the selected braking control level is higher than or equal to said maintaining level thereof.

* * * * *